United States Patent
Korah et al.

(10) Patent No.: US 7,636,426 B2
(45) Date of Patent: Dec. 22, 2009

(54) METHOD AND APPARATUS FOR AUTOMATED VOICE DIALING SETUP

(75) Inventors: Sarah Korah, San Jose, CA (US); John Vuong, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 801 days.

(21) Appl. No.: 11/201,671

(22) Filed: Aug. 10, 2005

(65) Prior Publication Data

US 2007/0041521 A1 Feb. 22, 2007

(51) Int. Cl.
*H04M 11/06* (2006.01)

(52) U.S. Cl. ............ 379/88.14; 379/88.19; 379/142.01; 455/412.1; 455/415; 455/466; 455/575.1; 704/231; 704/236

(58) Field of Classification Search ............... 379/88.13, 379/88.14, 207.14, 88.01, 88.03, 88.19, 142.01; 369/29.01; 455/557, 563, 412.1, 415, 466, 455/575.1; 704/270.1, 275, 231, 236
See application file for complete search history.

(56) References Cited

U.S. PATENT DOCUMENTS

| | | | | |
|---|---|---|---|---|
| 5,483,579 A | * | 1/1996 | Stogel | 379/88.03 |
| 5,651,056 A | * | 7/1997 | Eting et al. | 379/88.01 |
| 5,822,727 A | * | 10/1998 | Garberg et al. | 704/270.1 |
| 6,038,293 A | * | 3/2000 | McNerney et al. | 379/88.19 |
| 6,112,103 A | * | 8/2000 | Puthuff | 455/557 |
| 6,650,738 B1 | * | 11/2003 | Pershan et al. | 379/88.03 |
| 6,963,633 B1 | * | 11/2005 | Diede et al. | 379/88.03 |
| 6,983,244 B2 | * | 1/2006 | Junqua et al. | 704/231 |
| 7,010,111 B1 | * | 3/2006 | Blackburn et al. | 379/207.14 |
| 7,013,282 B2 | * | 3/2006 | Schrocter | 704/270.1 |
| 7,414,925 B2 | * | 8/2008 | Carro | 369/29.01 |
| 7,460,999 B2 | * | 12/2008 | Herron et al. | 704/275 |
| 2002/0107049 A1 | * | 8/2002 | Maquaire et al. | 455/563 |
| 2003/0069729 A1 | * | 4/2003 | Bickley et al. | 704/236 |
| 2004/0203613 A1 | * | 10/2004 | Zhu et al. | 455/412.1 |
| 2005/0175160 A1 | * | 8/2005 | Simpson et al. | 379/88.13 |
| 2005/0287997 A1 | * | 12/2005 | Fournier | 455/415 |
| 2006/0084450 A1 | * | 4/2006 | Dam Nielsen et al. | 455/466 |
| 2006/0183513 A1 | * | 8/2006 | Slamka et al. | 455/575.1 |
| 2008/0037741 A1 | * | 2/2008 | Bear et al. | 379/142.01 |

* cited by examiner

*Primary Examiner*—Gerald Gauthier

(57) ABSTRACT

A telecommunications device includes a voice dialer and a text-to-speech engine. The text-to-speech engine is configured to convert at least a portion of a user contact list information to speech and the voice dialer is configured to receive an audio input and perform a voice recognition, comparing said audio input to converted user contact list information.

16 Claims, 3 Drawing Sheets

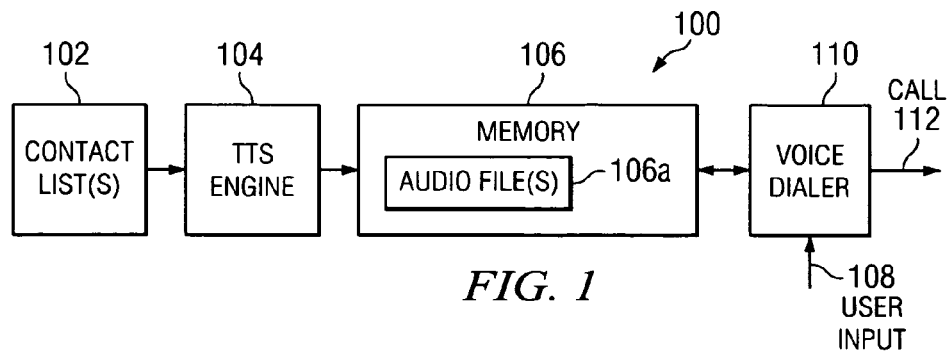
FIG. 1
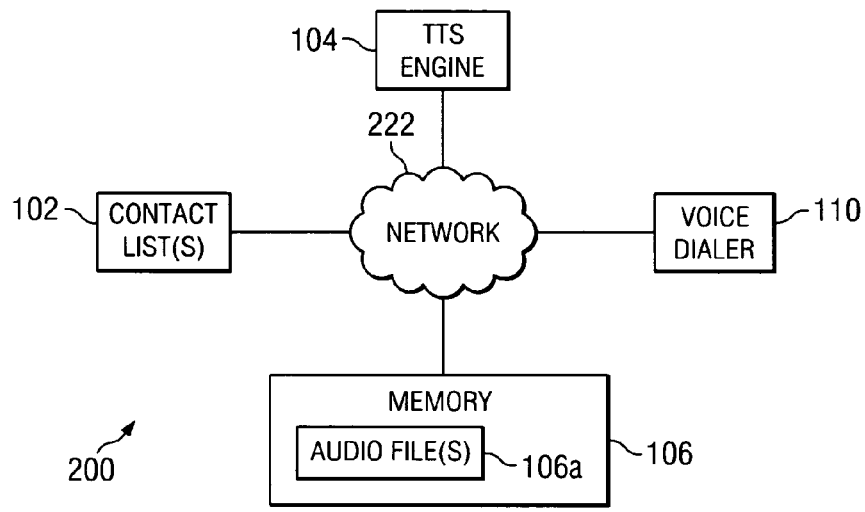
FIG. 2
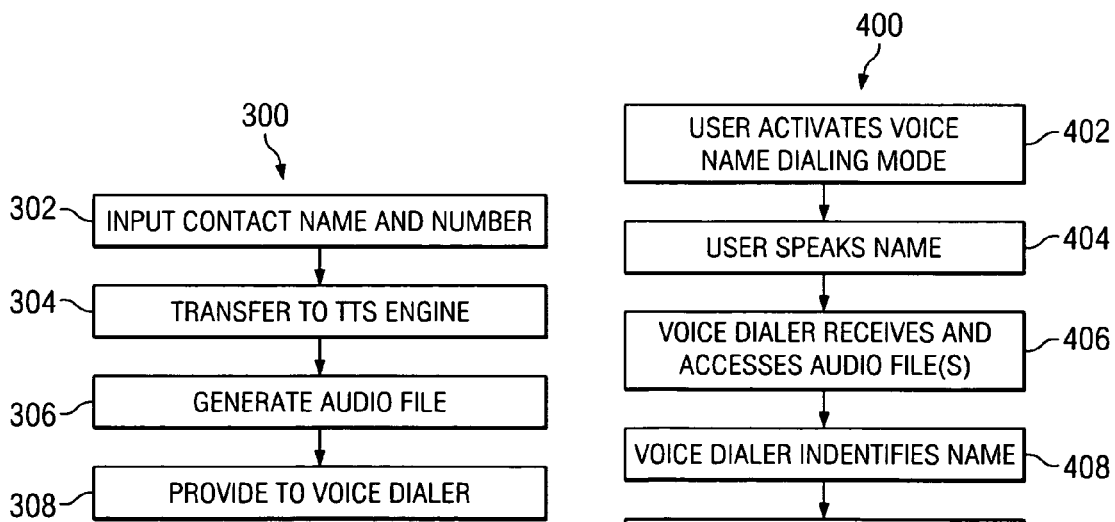
FIG. 3
FIG. 4

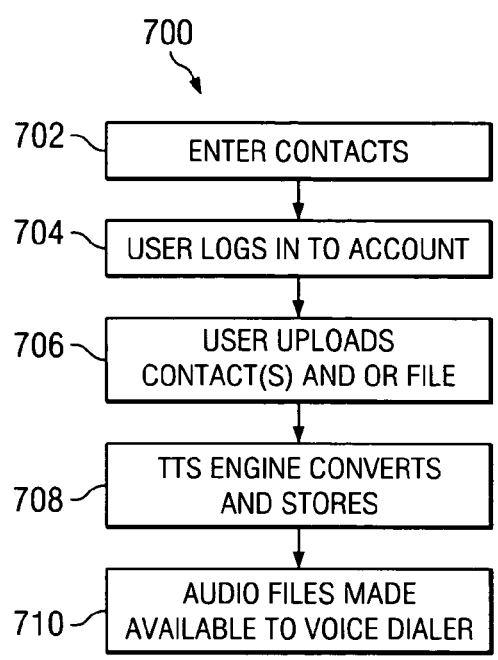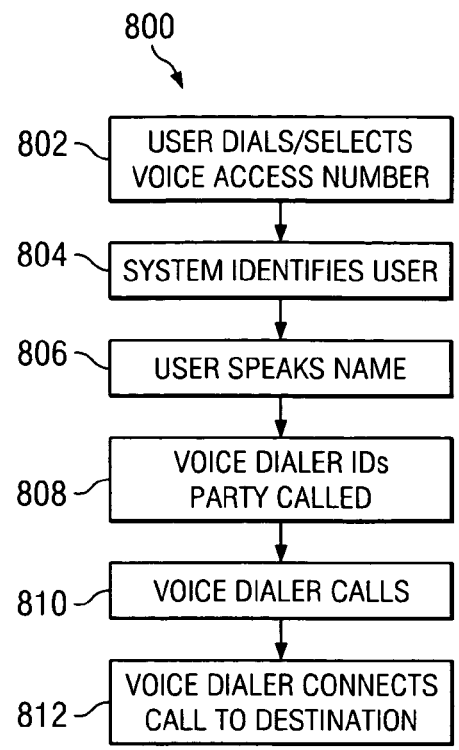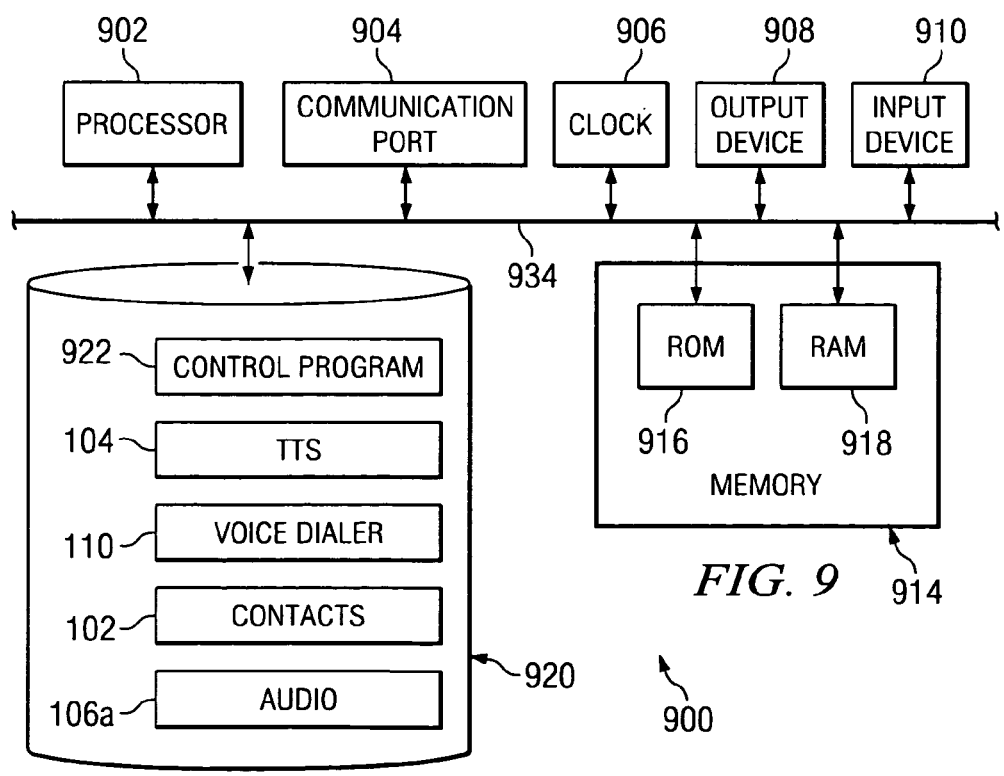

METHOD AND APPARATUS FOR AUTOMATED VOICE DIALING SETUP

BACKGROUND OF THE INVENTION

1. Field of the Invention

The present invention relates to telecommunications systems and, in particular, to an improved system for voice dialing setup.

2. Description of the Related Art

Many modern cellular telephones have voice dialing capabilities. To enable voice dialing for a particular contact, users must typically browse through their lists of contacts using a graphical user interface and select the contact with whom the user wishes to establish voice dialing. The user must then speak the contact's name. The name is then recorded and stored as an audio file.

To dial, the user (or other party) can select a voice dialing control and speak the name of the person he wishes to call. The voice dialer will use one or more speech recognition algorithms to compare the newly-spoken name to the recorded names for speech dialing enabled contacts. If there is a match, the call is made.

While voice dialing is a useful feature, it is cumbersome to set up for each contact in a user's address book. This is especially the case when the user has a large number of contacts.

SUMMARY OF THE INVENTION

These and other drawbacks in the prior art are overcome in large part by a system and method according to embodiments of the present invention.

A method for use in a telecommunication system according to embodiments of the present invention includes providing contact information to a text-to-speech engine; using said text-to-speech engine to generate an audio file of at least some of said contact information; and providing said audio file to a voice recognition unit for use in determining a voice input corresponding to said audio file has been received. In some embodiments, the text-to-speech engine is contained within a wireless telephony device for use in voice dialing. In other embodiments, the text-to-speech engine is provided in association with a network server.

A telecommunications system according to an embodiment of the present invention includes a text-to-speech engine for performing a text-to-speech conversion of contact information; and a voice dialer configured to receive a voice input and perform a voice recognition on said voice input using a result of said text-to speech conversion. In certain embodiments, the text-to-speech engine and voice dialer are incorporated in a cellular telephone. In others, the text-to-speech engine and voice dialer are incorporated in network server remote from a user device. In some embodiments, a personal computer may be used to transmit contact information to the network server.

A telecommunications device according to embodiments of the present invention includes a voice dialer and a text-to-speech engine. The text-to-speech engine is configured to convert at least a portion of a user contact list information to speech and the voice dialer is configured to receive an audio input and perform a voice recognition, comparing said audio input to converted user contact list information. In certain embodiments, the telecommunications device includes a cellular transceiver. In some embodiments, the device includes an interface for receiving contact list information. In some embodiments, the telecommunications device is implemented as a server configured to receive said contact information from a personal computer. The server may be configured to perform voice dialing on behalf of a cellular telephone.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 1 is a diagram schematically illustrating a system according to embodiments of the present invention.

FIG. 2 is a diagram schematically illustrating a system according to embodiments of the present invention.

FIG. 3 is a flowchart illustrating operation of an embodiment of the present invention.

FIG. 4 is a flowchart illustrating operation of an embodiment of the present invention.

FIG. 7 is a flowchart illustrating operation of an embodiment of the present invention.

FIG. 8 is a flowchart illustrating operation of an embodiment of the present invention.

FIG. 9 is a diagram schematically illustrating a server according to an embodiment of the present invention.

DETAILED DESCRIPTION OF EMBODIMENTS OF THE INVENTION

Figure 5:
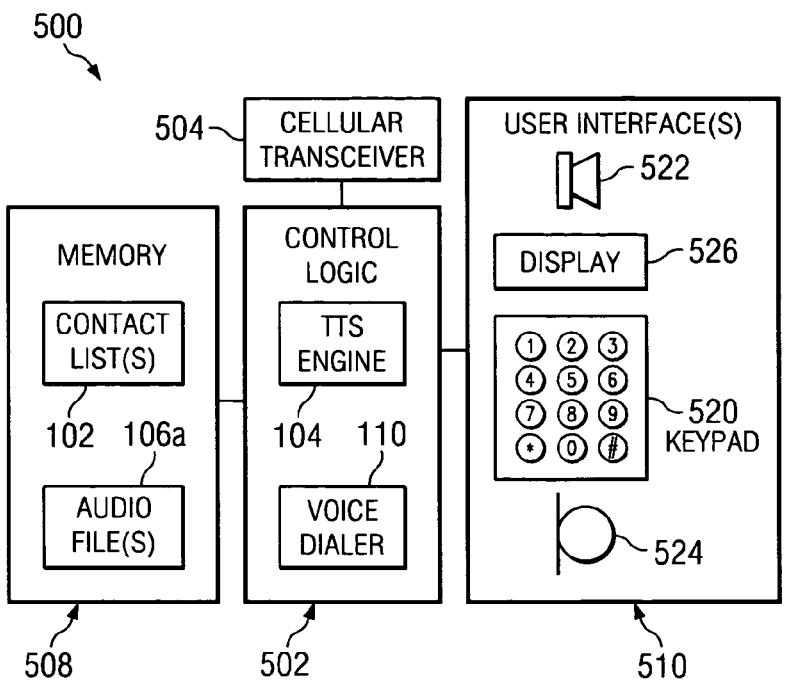
FIG. 5 is a diagram illustrating an exemplary cellular telephone in accordance with an embodiment of the present invention.

Turning now to the drawings and, with particular attention to FIG. 1, a diagram schematically illustrating a system 100 according to an embodiment of the present invention is shown. The system 100 includes one or more contact lists 102, a text-to-speech (TTS) engine 104, a memory 106 for storing voice files 106*a*, and a voice dialer 110. The voice dialer 110 may receive a voice input 108 and output one or more commands 112 to call the appropriate party. As will be explained in greater detail below, the system 100 may be implemented in a cellular telephone or distributed among various devices.

In operation, a contact list 102 may be generated by a user. For example, the user may employ one or more keypad or other user interface controls to enter the contact information. The contact list may be a list of parties and contact information such as telephone numbers, stored in a convenient memory location. The contact list entries can be received at the TTS engine 104, where they are converted to speech or audio files 106*a*. The audio files 106*a* are stored and associated with the corresponding contact information. When a user input 108 is received, the voice dialer 110 performs a speech recognition, comparing the spoken words to those of stored audio files corresponding to those users for whom voice dialing has been activated.

The text-to-speech engine 104, which may be embodied as a conventional text-to-speech engine, can receive text from various sources and generate an audio file corresponding to the input text. As will be explained in greater detail below, in accordance with embodiments of the present invention, the text-to-speech engine 104 may operate to access user data or information and generate one or more audio files from the user data, to be used for voice dialing. In addition, for confirmation, in certain embodiments, a user may be able to select the audio file for playback; if he finds it unacceptable, he can speak the name, which can then be recorded as an audio file for use in speech recognition. The text-to-speech generator 104 may be implemented in hardware and/or software operating on one or more servers, computer systems, host or mainframe computers, workstations, etc. In some embodiments the text-to-speech generator 104 may be operating on some or all of the same device(s) as other components in the system 100.

The contact list 102 may be a memory store for storing contact names and telephone numbers, as well as additional information. In certain embodiments, the contact list may be stored in the same memory 106 as the audio files. Typically, the contact list 102 may be accessed by other applications, such as a graphical user interface, and used for auto-dialing. In accordance with embodiments of the present invention, entries in the contact list may be provided to the TTS engine 104 for conversion of the names into audio files. In certain embodiments, the entries may be provided manually, or on an entry-by-entry basis. In other embodiments, the entire contact list may be "batch-converted," i.e., several contacts selected at a time for TTS conversion and voice dialing setup. The generated voice audio file is then associated with the corresponding contact information. The contact list 102 may be implemented in hardware and/or software operating on one or more servers, computer systems, host or mainframe computers, workstations, etc. In some embodiments the contact list may be operating on some or all of the same device(s) as other components in the system 100.

The memory 106 stores the voice files 106a output from the TTS engine 104. In some embodiments, the memory 106 may also store the contact list(s) 102. The memory 106 may be implemented in hardware and/or software operating on one or more servers, computer systems, host or mainframe computers, workstations, etc. In some embodiments the memory may be operating on some or all of the same device(s) as other components in the system 100.

The voice dialer 110 receives a user input at 108. In response, the voice dialer 110 accesses the voice files 106a and performs a speech recognition function or functions to determine if the input corresponds to one of the audio files 106a. If so, the voice dialer 110 will access the corresponding number, e.g., from the contact list, and cause the call to be made. The memory 106 may be implemented in hardware and/or software operating on one or more servers, computer systems, host or mainframe computers, workstations, etc. In some embodiments the memory 106 may be operating on some or all of the same device(s) as other components in the system 100.

In certain embodiments of the present invention, one or more of the components of the system 100 may be connected to or in communication with each other via a communication network. For example, turning now to FIG. 2, a system 200 including various components of the system 100 is illustrated, wherein some or all of the components are in communication via a network 222. The network 222 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 222 may be implemented using a TCP/IP network and may implement voice or multimedia over IP using, for example, the Session Initiation Protocol (SIP).

Operation of an embodiment of the present invention is illustrated more particularly with reference to FIG. 3, in which a flowchart 300 is shown. The particular arrangement of elements in the flowchart 300 is not meant to imply a fixed order to the elements; embodiments can be practiced in any order that is practicable.

In a step 302, a user or other party can input a contact name and his or her telephone number as or into the contact list(s) 102. In certain embodiments, this can include the user typing in or otherwise directly entering the contact information using an alphanumeric keypad or graphical user interface to a telephony device. In other embodiments, the contact list 102 can be uploaded to a telephony device from an application program running on a personal computer; in still other embodiments, the contact list 102 can be uploaded from a telephony device or personal computer to a service provider, as will be explained in greater detail below.

Next, in a step 304, either in response to a manual selection (individual or batch) or automatically, one or more contacts on the contact list 102 may be provided to the text-to-speech engine 104. As noted above, in certain embodiments, the user can select one or more contacts from the contact list for use in speech dialing, typically by highlighting address book entries using a graphical user interface. In other embodiments, the system will automatically select all entries, or all entries not yet selected.

In a step 306, the text-to-speech engine 104 will generate an audio file 106a for each entry in the contact list 102 that has been selected for processing. The audio file 106a can be stored in memory 106 in association with the identity of the corresponding contact.

Finally, in a step 308, information can be provided to the voice dialer 110 indicating that the particular audio file has been generated and that the associated contact is available for voice dialing.

In addition, in certain embodiments, the user may be able to select one or more controls to play back the file. If he doesn't like it, he may be able to speak the name and record it for use in speech recognition, i.e., replace the speech-converted audio file with one directly recorded. In addition, in certain embodiments, the user may be able to "voice browse" the contact list. That is, in addition to seeing the list in a GUI, and hearing the voice name corresponding to a selected user, in certain embodiments, upon selection of a voice browse mode, the user could be allowed to hear the names of all voice dialing enabled contacts.

Operation of an embodiment of the present invention is illustrated more particularly with reference to FIG. 4, in which a flowchart 400 illustrating operation of an embodiment of the present invention is shown. The particular arrangement of elements in the flowchart 400 is not meant to imply a fixed order to the elements; embodiments can be practiced in any order that is practicable.

Initially, in a step 402, a user can activate a voice dialing mode. For example, the user can select one or more activation keys on his telephone. Once the voice dialing mode has been activated, in a step 404, the user can speak the name of the party he wishes to call. In a step 406, the voice dialer 110 receives the input and accesses the memory for the corresponding audio file(s) 106a. In a step 408, the voice dialer 110 performs one or more speech recognition routines to identify the correct contact. Once the contact has been identified, the voice dialer 110 can make the call, in a step 410.

As noted above, embodiments of the present invention may be implemented in a telephone, such as a wireless or cellular telephone. An exemplary cellular telephone 500 including voice dialing capabilities in accordance with an embodiment of the present invention is shown in FIG. 5. In some embodiments, the cellular telephone 500 may implement one or more elements of the methods disclosed herein. As shown, the cellular telephone includes control logic 502 and cellular transceiver 504. The cellular transceiver 504 allows communication over a cellular telephone network, such as a GSM or GPRS based cellular telephone network. The control logic 502 generally controls operation of the cellular telephone and includes a voice dialer 110 and TTS engine 104 in accordance with embodiments of the present invention.

The control logic 502 interfaces to a memory 518 for storing, among other things, contact lists 102 and audio files 106a. The control logic 502 also interfaces to a user interface(s) 510. The user interface(s) 510 can include a keypad 520, speaker 522, microphone 524, and display 526. The keypad may include one or more "hard" keys and may be implemented in whole or in part as a cursor pointing device in association with one or more "virtual" keys on the display 526. In general, a user may make use of the keypad 520 and display 526 to enter contact information, and may speak into the microphone to provide the audio input(s). It is noted that other interfaces, such as voice activated interfaces may be provided. Thus, the figure is exemplary only.

Figure 6:
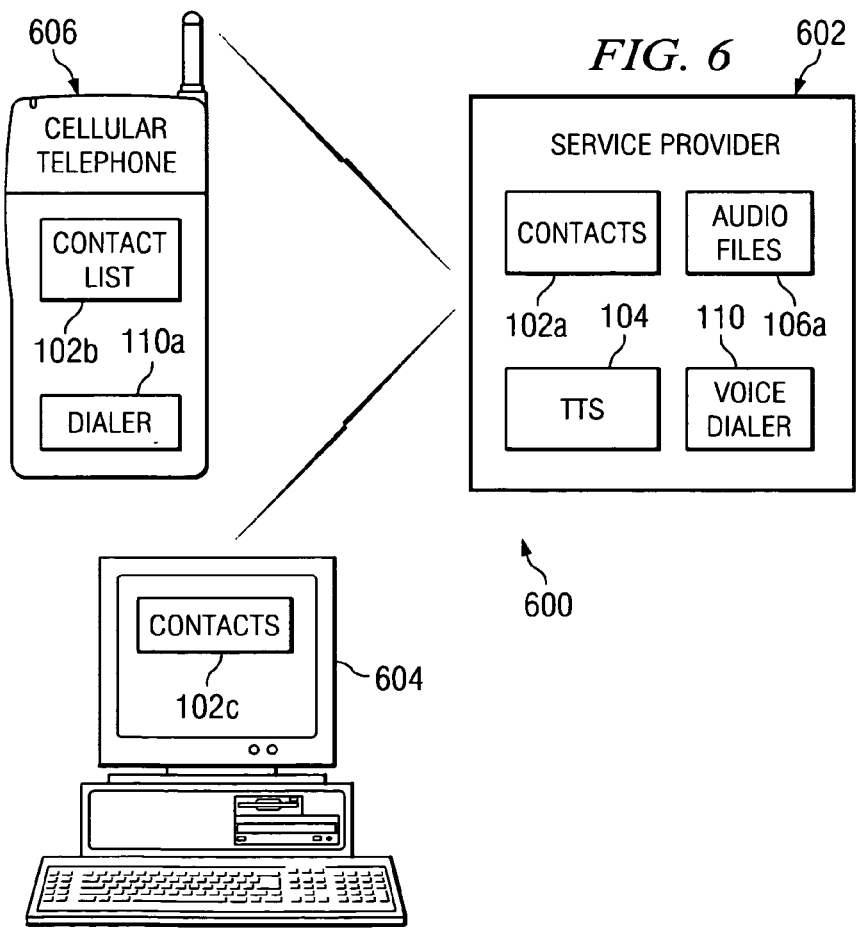
FIG. 6 is a diagram schematically illustrating a system according to embodiments of the present invention.

As noted above, in certain embodiments, the cell phone itself may implement the entire speech recognition-voice dialing system. In other embodiments, however, the TTS engine 104 and dialing functions may be removed from the cell phone and provided by a service provider. Such an implementation is shown with reference to FIG. 6. In particular, FIG. 6 illustrates an exemplary service provider 602, personal computer 604, and cellular telephone 606.

The cellular telephone 606, which may be generally similar to the cellular telephone of FIG. 5, may include an auto-dialer 110a and store a contact list 102b, although a TTS engine 104 is located at the server 602. In the embodiment of FIG. 6, the dialer 110a may be a voice dialer or traditional keypad dialer that can allow the user to call a desired telephone number or code for contacting the service provider 602, as will be explained in greater detail below. The contact list 102b may be similar to the contact list 102 of FIG. 1 and FIG. 5, but may be uploadable and/or downloadable to/from the service provider 602 and/or computer 604.

The service provider, which may be implemented as an Internet server, may implement a contacts list 102a, TTS engine 104, a memory for storing text and audio files 106a, and a voice dialer 110. The service provider 602 may be adapted to receive contact list 102a entries or files from the cell phone or the personal computer 604.

The personal computer 604 may be implemented as a conventional personal computer employing, for example, a Pentium series processor and the Windows XP operating system. In addition, the personal computer 604 may be used to set up and store a contacts list 102c, which may be transmitted to the cell phone 606 or the service provider 602 via, for example, an Internet connection, to be stored at the cell phone or service provider as contacts list 102b or 102a, respectively.

That is, depending on the embodiment, the user can enter his contacts into his contact list either at the cell phone or the personal computer, using a suitable interface. In the case of the personal computer, for example, this can include a Web browser used to connect to one or more web pages provided by the service provider 602.

In certain embodiments, the user can transmit the entries from the cell phone or the personal computer to the service provider 602. For example, the entries or files may be transmitted via an Internet connection. The service provider 602 will then function to convert the entries to audio files, in a manner similar to that discussed above. In certain embodiments, the server may accept contacts in a variety of data formats, e.g., text files, CSV files, Outlook dat files, xml, etc. In addition, in certain embodiments, the contact list is uploadable from the personal computer 604 to the cell phone 606; the cell phone can then transmit its contacts to the service provider.

When the user of the cell phone wishes to make a voice call, he can dial in to a special number at the service provider (e.g., *001); when he speaks the name of the party he wishes to talk with, the service provider 602 will perform speech recognition functions using the TTS engine 104. If the name is recognized, then the service provider 602's voice dialer 110 will operate to call the other party and also connect the called party to the cell phone 606.

This is illustrated more particularly with reference to FIG. 7, which is a flowchart 700 illustrating operation of an embodiment of the present invention. The particular arrangement of elements in the flowchart 700 is not meant to imply a fixed order to the elements; embodiments can be practiced in any order that is practicable.

In a step 702, a user can enter one or more contacts into a contact list. For example, as discussed above, the user can employ a suitable user interface at either the cellular telephone or the personal computer, depending on the embodiment. In a step 704, the user can log in to a web account provided by his service provider. For example, as noted above, the user can employ a personal computer with a web browser or a suitably equipped cellular telephone. In a step 706, the user can upload one or more contact list entries or an entire contact list file. For example, the user interface provided by either the telephone or the personal computer may allow for selection of individual entries or a "batch" selection of multiple entries, or selection of a contact list file. In a step 708, the voice dialer 110 at the service provider 602 stores the contact list (entries) and causes the TTS engine 104 to perform its conversions on the entries, which stores them as audio files 106a in association with the contacts. Finally, in a step 710, the files are made available to the voice dialer 110.

Again, as in the case of the cell-phone only embodiment, the user may be able to access the audio file for confirmation playback. In such an embodiment, the user may be able to dial an access code to connect to the server and enter or access a confirmation mode or routine; the server will access the file and play it back for the user. If the user finds it unsuitable, the user may be given the option of speaking and recording the name, replacing the converted version.

Turning now to FIG. 8, a flowchart 800 illustrating operation of an embodiment of the present invention is shown. The particular arrangement of elements in the flowchart 800 is not meant to imply a fixed order to the elements; embodiments can be practiced in any order that is practicable.

In a step 802, the user can dial the voice dial access number from his cellular telephone and connect to the server 602 using the public switched telephone network. As noted above, this can involve pressing one or more alphanumeric keys, or other controls, such as dedicated buttons on the cellular telephone 606. In a step 804, the system can identify the user; for example, the system could identify the phone the user is calling from, or the number dialed into. Alternatively, the system could prompt the user to enter or say an identification.

In a step 806, once the voice dial system has been accessed, the user can speak the name of the party he is attempting to call. In a step 808, the voice dialer 110 receives the input, and compares it against the names of parties for whom voice dialing is activated. That is, the voice dialer 110 will access the audio files 106*a* and perform one or more speech recognition functions. If the name is identified, then in a step 810, the voice dialer 110 will cause the service provider 602 to make a call to the other party. Finally, the server 602 can connect the caller to the other party, in a step 812.

FIG. 9 is a diagram illustrating an exemplary server 900 according to embodiments of the present invention. The server 900 may be representative, for example, of the service provider of FIG. 6. In some embodiments, the server 900 may include or operate a text-to-speech engine 104, contacts lists 102, voice dialer 110, and audio files 106*a*. The server 900 may be embodied as a single device or computer, a networked set or group of devices or computers, a workstation, mainframe or host computer, etc. In some embodiments, the server 900 may implement one more elements of the methods disclosed herein.

The server 900 may include a processor, microchip, central processing unit, or computer 902 that is in communication with or otherwise uses or includes one or more communication ports 904 for communicating with user devices and/or other devices. The communication ports 904 may include such things as local area network adapters, wireless communication devices, telephone network adapters, Bluetooth technology, etc. The server 900 also may include an internal clock element 906 to maintain an accurate time and date for the server 900, create time stamps for communications received or sent by the server 900, etc.

If desired, the server 900 may include one or more output devices 908 such as a printer, infrared or other transmitter, antenna, audio speaker, display screen or monitor, text to speech converter, etc., as well as one or more input devices 910 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 900 may include a memory drive or data storage device 920 to store information, software, databases, documents, communications, device drivers, etc. The memory or data storage device 920 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 900 also may include memory 914, such as ROM 919 and RAM 919.

The processor 902 and the data storage device 920 in the server 900 each may be, for example: (i) located entirely within a single computer or other computing device; or (ii) connected to each other by a remote communication medium, such as a serial port cable, telephone line or radio frequency transceiver. In one embodiment, the server 900 may be implemented as one or more computers that are connected to a remote server computer for maintaining databases.

A conventional personal computer or workstation with sufficient memory and processing capability may be used as the server 900. The server 900 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 902. Other suitable processors may be available from Motorola, Inc., AMD, or Sun Microsystems, Inc. The processor 902 also may be embodied as one or more microprocessors, computers, computer systems, etc.

Software may be resident and operating or operational on the server 900. The software may be stored on the data storage device 920 and may include a control program 922 for operating the server, databases, etc. The control program 922 may include or interface to the text-to-speech engine 104, voice dialer 110, contacts lists 102, and audio files 106*a*.

The control program and control units may control the processor 902. The processor 902 may perform instructions of the control programs, and thereby operate in accordance with the methods described in detail herein. The control program and control units may be stored in a compressed, uncompiled and/or encrypted format. The control program and control units furthermore includes program elements that may be necessary, such as an operating system, a database management system and device drivers for allowing the processor 902 to interface with peripheral devices, databases, etc. Appropriate program elements are known to those skilled in the art, and need not be described in detail herein.

According to some embodiments, the instructions of the control program may be read into a main memory from another computer-readable medium, such as from the ROM 916 to the RAM 918. Execution of sequences of the instructions in the control program causes the processor 902 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 902, communication ports 904, clock 906, output device 908, input device 910, data storage device 920, ROM 919, and RAM 919 may communicate or be connected directly or indirectly in a variety of ways. For example, the processor 902, communication ports 904, clock 906, output device 908, input device 910, data storage device 920, ROM 919, and RAM 919 may be connected via a bus 934.

While specific implementations and hardware/software configurations for the server 900 have been illustrated, it should be noted that other implementations and hardware configurations are possible and that no specific implementation or hardware/software configuration is needed. Thus, not all of the components illustrated in FIG. 9 may be needed for the server 900 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents

What is claimed is:

1. A method for use in a telecommunication system, comprising:
   providing contact information to a text-to-speech engine incorporated in a wireless telephony device;
   using said text-to-speech engine to generate an audio file of at least some of said contact list information;
   storing the audio file in a memory; and
   providing said stored audio file to a voice recognition unit for use in determining if a voice input corresponding to said stored audio file has been received.

2. The method in accordance with claim 1 wherein said using said text-to-speech engine comprises using said text-to-speech engine at said wireless telephony device.

3. The method in accordance with claim 2, further including speaking contact information into said wireless telephony device to make a voice call.

4. The method in accordance with claim 3, wherein said wireless telephony device is a cellular telephone.

5. A telecommunications system, comprising:
   a text-to-speech engine for performing a text-to-speech conversion of contact information to generate at least one audio file, wherein said text-to-speech engine is incorporated in a wireless telephony device;
   a memory for storing the audio file; and
   a voice dialer configured to receive a voice input and perform a voice recognition on said voice input using the stored audio file generated by said text-to-speech engine.

6. The telecommunications system in accordance with claim 5, wherein said voice dialer is incorporated in the wireless telephony device.

7. The telecommunications system in accordance with claim 5, wherein said wireless telephony device is a cellular telephone.

8. The telecommunications system in accordance with claim 1 wherein said wireless telephony device is a cellular telephone.

9. A wireless telephony device including a voice dialer and a text-to-speech engine, wherein the text-to-speech engine is configured to convert at least a portion of a user contact list information to an audio file and store the audio file in a memory, and said voice dialer is configured to receive a voice input and perform a voice recognition, comparing said voice input to the stored audio file.

10. The wireless telephony device in accordance with claim 9, further including a cellular transceiver.

11. The wireless telephony device in accordance with claim 9, said telecommunications device further including an interface for receiving contact list information.

12. The wireless telephony device in accordance with claim 11, configured to receive said contact list information from a personal computer.

13. The wireless telephony device in accordance with claim 12, comprising a cellular telephone.

14. The method in accordance with claim 1 wherein said contact information comprises a contact list including at least one contact name and at least one telephone number.

15. The method in accordance with claim 14 wherein said using said text-to-speech engine to generate an audio file of at least some of said contact information comprises batch-converting the contact list to generate multiple audio files.

16. The method in accordance with claim 9 wherein said text-to-speech engine is further configured to batch-convert the contacts list information to generate multiple audio files.

* * * * *